United States Patent [19]

Inata et al.

[11] 3,972,852
[45] Aug. 3, 1976

[54] PROCESS FOR PREPARING AROMATIC POLYESTERS FROM DIPHENOLS

[75] Inventors: Hiroo Inata; Shoji Kawase; Takeo Shima, all of Iwakuni, Japan

[73] Assignee: Teijin Ltd., Osaka, Japan

[22] Filed: Aug. 5, 1974

[21] Appl. No.: 494,870

[30] Foreign Application Priority Data

| Aug. 7, 1973 | Japan | 48-87982 |
| June 21, 1974 | Japan | 49-70117 |
| June 22, 1974 | Japan | 49-70796 |
| May 25, 1974 | Japan | 49-58414 |
| May 27, 1974 | Japan | 49-57791 |

[52] U.S. Cl. .................. 260/47 C; 260/47 XA; 260/49; 260/860
[51] Int. Cl.$^2$ .................. C08G 63/18; C08G 63/26
[58] Field of Search ............. 260/47 C, 49, 47 XA, 260/860

[56] References Cited
UNITED STATES PATENTS

| 2,595,343 | 5/1952 | Drewitt et al. | 260/47 |
| 3,395,119 | 7/1968 | Blaschke et al. | 260/47 |
| 3,398,120 | 8/1968 | Hindersinn et al. | 260/47 |
| 3,433,770 | 3/1969 | Shima et al. | 260/75 |
| 3,444,141 | 5/1969 | Shima | 260/75 |
| 3,525,715 | 8/1970 | Hrach et al. | 260/47 |
| 3,801,547 | 4/1974 | Hoeschele | 260/75 |

*Primary Examiner*—Lester L. Lee
*Attorney, Agent, or Firm*—Sherman & Shalloway

[57] ABSTRACT

In a process of preparing aromatic polyesters from (A) aromatic dicarboxylic acids and (B) diphenols by the solid phase polymerization method, the speed of the solid phase polymerization reaction can be enhanced to a marked degree by copolymerizing (C) an aliphatic dihydroxy compound, and in this case the amounts in which the components (B) and (C) are used, based on (A), being 70 – 105 mol % of (B) and 1 – 50 mol % of (C), with the total amount of (B) and (C) corresponding to 100 – 130 mol % of (A).

10 Claims, No Drawings

PROCESS FOR PREPARING AROMATIC POLYESTERS FROM DIPHENOLS

This invention relates to a process for preparing polyesters. More particularly, the invention relates to improvements in the process for preparing an aromatc linear polyester from an aromatic dicarboxylic acid or its ester-forming compound and a diphenol.

Polyethylene terephthalate is well known, and in view of its excellent mechanical properties and resistance to attack by chemicals, it is being widely used commercially. It however has such drawbacks as that its deflection temperature under load is relatively low, degree of crystallinity is great and moreover its crystallization speed is also fast, with the consequence that its dimensional stability and transparency are poor.

On the other hand, polycarbonates are known to be a material possessing a high deflection temperature under load and superior transparency but have the shortcoming that their resistance to attack by chemicals is unsatisfactory.

For improving on such drawbacks, attempts have been made to polycondense an aromatic dicarboxylic acid or its derivative with a diphenol. For instance, known is a method of reacting an aromatic dicarbonyl chloride with a diphenol in a solvent or a method of melt polymerizing a diaryl ester of an aromatic dicarboxylic acid with a diphenol. However, in the former instance, the productivity suffers because of an increase in the processing steps such as the necessity of removing the solvent that results from its use. On the other hand, in the latter instance, there are such drawbacks as that difficulty is experienced in raising the degree of polymerization, because the melt viscosity of the polymer is exceedingly high, and also that the polymer tends to become discolored, since the reaction is carried out at elevated temperatures.

It is therefore an object of the present invention to provide a process for the preparation of polyesters having a high deflection temperature under load as well as superior dimensional stability, thermal resistance and resistance to attack by chemicals.

Another object of the invention is to provide a convenient process for preparing aromatic polyesters by which process polymers of high degree of polymerization can be obtained without using a solvent.

It has now been found by us that when a specific glycol is copolymerized in a specific proportion in the case where the primary reaction is carried out in a molten state followed then by a solid phase polymerization reaction the speed of the solid phase polymerization reaction becomes exceedingly rapid, with the consequence that the foregoing objects of the present invention can be achieved.

Thus, the foregoing objects of the invention are achieved by a process for preparing linear aromatic polyesters wherein in preparing such polyesters by reacting in a molten state (A) an aromatic dicarboxylic acid or an ester-forming derivative thereof with (B) a diphenol to prepare a polymer, whch is then further polymerized in the solid phase to prepare the linear aromatic polyester, the foregoing reaction is carried out in the presence of (C) at least one dihydroxy compound or a carboxylic acid ester thereof, said dihydroxy compound being selected from the group consisting of a straight chain or branched chain aliphatic glycol of 2 – 12 carbon atoms, an alicyclic glycol and a compound having attached to its aromatic rings two hydroxyalkylene or hydroxyalkyleneoxy groups, the alkylene portion of which contains 2 – 6 carbon atoms, the components (B) and (C) being used in proportions, based on (A), of 70 – 105 mol % of (B) and 1 – 50 mol % of (C), the total amount of (B) and (C) corresponding to 100 – 130 mol % of (A).

In this invention, any aromatic dicarboxylic acid can be used as the component (A). As those typical, included are terephthalic acid, isophthalic acid, 2-methylterephthalic acid, 4-methylisophthalic acid, naphthalenedicarboxylic acid, diphenyldicarboxylic acid, diphenyl ether dicarboxylic acid, diphenyl sulfone dicarboxylic acid and diphenoxyethane dicarboxylic acid. Of these aromatic dicarboxylic acids, the use of terephthalic acid and naphthalenedicarboxylic acid is especially to be preferred. While it is possible to use any of its ten classes of isomers in the case of naphthalenedicarboxylic acid, especially to be preferred is the use of naphthalene-2,6-dicarboxylic acid, naphthalene-2,7-dicarboxylic acid and naphthalene-1,5-dicarboxylic acid.

It is also possible to conjointly use along with the aromatic dicarboxylic acids as a part of the component (A) the other classes of dicarboxylic acids such as adipic and sebacic acids and such hydroxycarboxylic acids as p-beta-hydroxyethoxybenzoic acid. The other dicarboxylic acids and/or hydroxy acids that are conjointly used are preferably used in an amount of not more than 30 mol %, and particularly not more than 20 mol %, of the total amount used of component (A).

The ester-forming derivatives of the carboxylic acids used as conponent (A) can also be used in place of such carboxylic acids as component (A). As such ester-forming derivatives, mention can be made of such lower alkyl esters as methyl, ethyl, propyl and butyl esters, and aryl esters such as phenyl and, tolyl esters. Of these, the aryl esters are especially to be preferred. And of the aryl esters, it is best to use the diaryl esters, if possible, and preferred is that in which the aryl radical contains 6 – 12 carbon atoms.

As the diphenols to be used as component (B) in the invention process, any having in its molecule two hydroxyl groups in its molecule and, further, not possessing an ester-forming functional group can be used. As such compounds, there can be mentioned such, for example, as 2,2-bis(4-hydroxyphenyl)propane [bisphenol A], 1,1-bis(4-hydroxyphenyl) cyclohexane [bisphenol Z], 1,1-bis(4-hydroxyphenyl)ethane, bis(4-hydroxyphenyl)methane, 1,2-bis(4-hydroxyphenyl)ethane, bis(4-hydroxyphenyl)phenylethane, bis(4-hydroxyphenyl)cyclohexylmethane, 3,3-bis(4-hydroxyphenyl) pentane, bis(4-hydroxyphenyl)sulfone and bis(4-hydroxyphenyl)ether. These compounds may be used either singly or in combinations of two or more thereof. Of these, especially preferred are bisphenol A and bisphenol Z.

In the process of the present invention, component (B) is used in proportions of at least 70 mol %, and preferably 80 mol %, relative to component (A). When this amount is less than 70 mol %, the deflection temperature under load and melting point of the resulting polyester are not high. Hence, the results obtained are not desirable, since the heat resistance of the polyester is inadequate.

The upper limit in which component (B) is used is 105 mol %, and preferably 100 mol %, of component (A). The use of component (B) in excess of 105 mol % is not desirable, since it becomes difficult to increase the degree of polymerization.

The specific dihydroxy compound that is used in the invention process as component (C) is selected from (1) a straight or branched chain aliphatic glycol of 2 – 12 carbon atoms, (2) an alicyclic glycol and (3) a compound having attached to its aromatic ring two hydroxyalkylene or hydroxyalkyleneoxy groups, the alkylene portion of which contains 2 – 6 carbon atoms. The foregoing compound (3) can be expressed by the formula $$HO(CH_2)_n - Y - Ar - Y - (CH_2)_m OH$$

wherein Ar is a divalent aromatic residue, Y is either oxygen or a direct bond, and $n$ and $m$ are integers from 2 to 6.

As examples of the foregoing component (C) dihydroxy compounds, included are the aliphatic glycols such as ethylene glycol, propylene glycol, trimethylene glycol, tetramethylene glycol, neopentylene glycol, 2-ethyl-2-methylpropanediol and hexamethylene glycol, the cyclic aliphatic glycols such as cyclohexanedimethylol and tricyclodecanedimethylol and the aliphatic glycols containing the aromatic ring such as 4,4'-bis($\beta$-hydroxyethoxy) diphenylsulfone, 4,4'-bis($\omega$-hydroxytetramethyleneoxy)diphenylsulfone, 4,4'-bis($\beta$-hydroxyethoxy)diphenyl ether, 4,4'-bis($\beta$-hydroxyethoxy) diphenylamine, 2,2'-bis(4-$\beta$-hydroxyethoxyphenoxy)ethane, 2,2-bis(4-$\beta$-hydroxyethoxyphenyl)propane, 1,1-bis(4-$\beta$-hydroxyethoxyphenyl)cyclohexane, 1,4-bis($\beta$-hydroxyethoxy)benzene, 4,4'-bis($\beta$-hydroxyethoxy)diphenyl and 2,6-bis($\beta$-hydroxyethoxy)naphthalene. Of these, the aliphatic glycols containing the aromatic ring are to be preferred.

Instead of the component (C) dihydroxy compounds illustrated above, their carboxylic acid esters, and especially the esters of dicarboxylic acid and/or hydroxycarboxylic acids and/or the polymers thereof can also be used as component (C). As the dicarboxylic acid and hydroxycarboxylic acid components, included are, for example, the aromatic, aliphatic and alicyclic dicarboxylic acids and hydroxycarboxylic acids mentioned for use as component (A). Especially preferred of these acids are terephthalic acid, isophthalic acid and naphthalene-2,6-dicarboxylic acid.

The foregoing esters and/or polymers thereof denote the bisglycol esters of dicarboxylic acids and/or the glycol esters of hydroxycarboxylic acids obtained, for example, by the ester interchange reaction of a lower alkyl ester (e.g. a methyl ester) of a dicarboxylic acid and/or hydrocarboxylic acid with a glycol, the esterification reaction of a dicarboxylic acid and/or hydroxycarboxylic acid with a glycol, or the reaction of a dicarboxylic acid and/or hydroxycarboxylic acid with an ester-forming derivative of a glycol (e.g. ethylene oxide); or the polyesters obtained by the deglycolization reaction of these esters. As one typical example of these, mention can be made of the monomer such as bis($\beta$-hydroxyethyl) terephthalate constituting the terephthalic acid component and the ethylene glycol component, or polyethylene terephthalate, its polymer.

As the aforesaid esters or polymers thereof to be used as component (C), especially preferred are the monomers and/or polymers that are terminated with a glycol component. Again, while the polymer used may be one of any degree of polymerization, especially to be preferred is one whose degree of polymerization is not greater than 10.

The foregoing carboxylic acid ester or its polymer is used in an amount such that the amount of glycol component constituting the ester or its polymer satisfies the hereinafter given proportion in which component (C) is used. In this case, the amount of dicarboxylic acid and hydroxycarboxylic acid components constituting the ester or its polymer is added to component (A).

In the invention process the component (C) is used in an amount of 1 – 50 mol %, preferably 3 – 40 mol %, and more preferably 5 – 30 mol % of component (A). When the amount used of component (C) is less than 1 mol %, hardly any improvement in the speed of the solid phase polymerization reaction can be had and, moreover, difficulty will be experienced in producing polyesters of high degree of polymerization. On the other hand, when the amount used exceeds 50 mol %, this also is undesirable, since the deflection temperature under load of the resulting polyester is low, and its heat resistance also suffers.

Further, according to the invention process, the total amount used of component (B) and component (C) is adjusted such that it is 100 – 130 mol %, and preferably 105 – 120 mol %, of component (A). When this amount is less than 100 mol % or exceeds 130 mol %, high molecular weight polymers cannot be obtained. Hence, when the total of components (B) and (C) is either less than the foregoing lower limit or greater than the foregoing upper limit, the results obtained are unsatisfactory.

In preparing aromatic polyesters by the invention process, first, the components (A), (B) and (C) are reacted in a molten state. In carrying out the reaction in a molten state, generally speaking, any of the methods known as being methods of melt-polymerizing polyesters can be employed. For instance, usable are such methods as (1) that comprising esterifying an aromatic dicarboxylic acid, a dihydroxy aromatic compound and an aliphatic glycol in the presence of a diaryl carbonate to form a bisdiol ester and/or low polymer thereof and thereafter polycondensing the bisdiol ester and/or low polymer thereof; or (2) that comprising carrying out the ester-interchange reaction of an ester of an aromatic dicarboxylic acid (e.g. a diphenyl ester), a diphenol and an aliphatic glycol in the presence of a catalyst to form a bisdiol ester and/or low polymer thereof and thereafter polycondensing the bisdiol ester and/or low polymer thereof.

When the polycondensation reaction is carried out by the abovedescribed method (1) (i.e., when using a component (A) in the form of a free acid), the polycondensation reaction is best carried out, as indicated above, in the presence of a diaryl carbonate as component (D), the diaryl carbonate having the general formula $$X-O-\overset{\overset{\displaystyle O}{\|}}{C}-O-Z$$

wherein X and Z which may be the same or different are inert radicals, e.g., aryl radical such as phenyl, tolyl, naphthyl and diphenyl radicals. As specific examples of such diaryl carbonates, mention can be made of such compounds as diphenyl carbonate, ditolyl carbonate, bis(chlorophenyl) carbonate, dinaphthyl carbonate and bis(diphenyl) carbonate. Diphenyl carbonate is especially preferred.

When component (D) is used, it is used in proportions of at least 150 mol %, and preferably 210 – 300 mol %, of component (A). The reaction proceeds at a faster pace by the use of component (D), and polymers of higher degree of polymerization are obtained.

The preferred reaction temperature in carrying out the melt-polymerization reaction is 200° – 300°C., and preferably 230° – 290°C. The melt-polymerization reaction is carried out until the crystal melting point of the primary reaction product becomes of an order suitable for use in the solid phase polymerization reaction. And as a criterion for determining this point, the reduced specific viscosity ($\eta sp/C$) as measured on a solution of the polymer resulting from the melt-polymerization reaction, in a phenol/tetrachloroethane (60 : 40 weight ratio) solvent mixture at 35°C. with $C = 1.2$ is suitably used, the reaction being carried out until this reduced specific viscosity becomes 0.15 – 0.4, and preferably 0.20 – 0.35.

When the reduced specific viscosity is less than 0.15, the melting point of the product is low, and this makes it undesirable for use in the following crystallization and solid phase polymerization reactions. On the other hand, a reduced specific viscosity in excess of 0.4 is also undesirable, for not only the stability of the molten state of the reaction product becomes poor, but also the polymer tends to become discolored.

Next, the molten reaction product polymer is submitted to the solid phase polymerization reaction. For ensuring that the solid phase polymerization reaction proceeds stably without coalescence being set up between polymers during the reaction, it is preferred that the crystallization of the primary polymer be carried out thoroughly. However, in the case where the reaction product has solidified (crystallized) during the primary reaction, the reaction product can be submitted as such to the solid phase polymerization reaction. As methods that can be employed for crystallizing the molten reaction product, one is that comprising heat treating the molten reaction product, and another is that comprising treating the reaction product with a crystallizing solvent, e.g., ketones such as acetone, methyl ethyl ketone, methyl isobutyl ketone and acetophenone, esters such as ethyl acetate, aromatic hydrocarbons such as benzene, toluene and xylene, ethers such as ether, tetrahydrofuran and dioxane, and amines such as dimethylformamide.

The conditions desirable for conducting the solid phase polymerization of the primary reaction product are as follows:

Form: powder, chips.
Temperature: 200° – 320°C., preferably 230° – 300°C., and more preferably 240° – 280°C.
Atmosphere: Under a stream of an inert gas (e.g., under a stream of nitrogen gas) or under reduced pressure.

The solid phase polymerization reaction is best carried out until the reduced specific viscosity of the product becomes at least 0.5, and preferably at least 0.6. While the reaction time will vary depending upon such factors as the form of the polymer, temperature, etc., the desired high degree of polymerization can be attained by submission of the product to the above-indicated conditions for at least 30 minutes.

In the invention process, such additives as catalysts, stabilizers, colorants, etc., that are usually used in the preparation of polyesters can be used with no trouble at all. The use of a titanium compound such as titanium tetrabutoxide, an antimony compound such as antimony trioxide or an organo tin compound such as dibutyl tin oxide as catalyst is especially to be preferred, since the effects are great, and polymers having a satisfactory color tone can be obtained.

It is possible to obtain in accordance with the hereinbeforedescribed process of the present invention aromatic polyesters of sufficiently high degree of polymerization, whose deflection temperature under load is high, and which excel in dimensional stability, transparency, heat resistance and resistance to attack by chemicals.

The following examples are given for more fully illustrating the present invention. The parts in the examples are on weight basis. Further, $\eta sp/C$ is the reduced specific viscosity as measured in a 60/40 wt. ratio phenol/tetrachloroethane solvent mixture at 35°C. with $C = 1.2$. On the other hand, the deflection temperature under load was measured in accordance with ASTM Method D-648, the tensile yield strength and elongation at break were determined in accordance with ASTM Method D-638, the flexural strength was measured in accordance with ASTM Method D-790, and the impact strength was determined in accordance with ASTM Method D-256.

EXAMPLE 1

A reactor equipped with a rectifying column was charged with 318 parts of diphenyl terephthalate, 223 parts of bisphenol A, 10.5 parts of neopentylene glycol and 0.07 part of titanium tetrabutoxide, and the reaction was performed at 250° to 280°C. for about 60 minutes. The resulting phenol was distilled out of the system.

During this time, 105 parts of phenol was distilled out. In order to drive off the phenol formed in the reaction system completely, the reaction was further carried out at 280°C. at an absolute pressure of 20 mmHg for 10 minutes. At this time, the amount of the phenol distilled was 149 parts (the degree of ester-interchange 79.3 %).

The pre-reaction product so obtained was in the stable molten state at 280°C. The pre-reaction product in the molten state was withdrawn from the reactor while being gradually cooled, and thus crystallized. The resulting polymer had an $\eta sp/c$ of 0.21.

The crystallized pre-reaction product was pulverized to a size of about 20 mesh, and then placed in a solid phase polymerization apparatus equipped with a stirrer. With stirring, the temperature was raised from 200°C. to 260°C. at an absolute pressure of about 0.5 mmHg over the course of about 3 hours. The product was polymerized in the solid phase at 260°C. for 2 hours. The resulting polymer had an $\eta sp/c$ of 0.78.

The polymer obtained was injection molded at 370°C. The deflection temperature under load (264 per square inch) of the molded article was found to be 162°C. The molded article was also found to have a tensile yield strength of 705 Kg/cm$^2$, and elongation at break of 34 %, a flexural strength of 812 Kg/cm$^2$ and an impact strength (⅛ inch notched) of 24 Kg cm/cm.

EXAMPLE 2

The pre-reaction product obtained in Example 1 when the degree of ester-interchange reached 79.3 % was withdrawn from the reactor while being rapidly cooled. It was pulverized to a size of about 20 mesh. The polymer had an $\eta sp/c$ of 0.21. The resulting powder was treated with 1000 parts of acetone at room temperature for 30 minutes to crystallize it. After drying, the crystallized product was polymerized in the solid phase at 260°C. at an absolute pressure of about 0.5 mmHg for 4 hours. The resulting polymer had an $\eta sp/c$ of 0.68.

The polymer was injection molded at 360°C., and the molded article was found to have a deflection temperature under load (264 per square inch) of 161°C.

EXAMPLE 3

A flask equipped with a rectifying column was charged with 36.8 parts of diphenyl naphthalene-2,6-dicarboxylate, 22.3 parts of bisphenol A, 1.1 parts of neopentylene glycol and 0.007 part of titanium tetrabutoxide, and the reaction was performed at 240° to 260°C. for about 60 minutes. Phenol resulting from the reaction was distilled out of the system. Then, the reaction temperature was raised to 280°C., and the pressure of the reaction system was reduced to about 50 mmHg (absolute). Under these conditions, the reaction was continued for an additional 15 minutes. During this time, 14 parts of the phenol was distilled out (the degree of ester-interchange 74.5 %).

The pre-reaction product so obtained exhibited a stable molten state at 280°C. When it was withdrawn from the reactor while being gradually cooled, it was crystallized. The polymer obtained had an $\eta sp/c$ of 0.27.

The crystallized reaction product was pulverized to a size of about 14 mesh, and then polymerized in the solid phase under the same conditions as in Example 1.

The polymer obtained had an $\eta sp/c$ of 0.72.

The polymer was injection molded at 370°C. The molded article obtained was found to have a deflection temperature under load of 185°C.

EXAMPLE 4

A reactor was charged with 318 parts of diphenyl terephthalate, 217 parts of bisphenol A, 7.4 parts of ethylene glycol and 0.068 part of titanium tetrabutoxide, and the reaction was performed for about 2 hours at 230° to 280°C. Phenol resulting from the reaction was distilled out of the system. Then, the pressure of the reaction system was reduced to below 0.5 mmHg (absolute) over the course of 30 minutes while maintaining the temperature at 280°C. The reaction was carried out under these conditions for another 30 minutes. During this time, the reaction product was solidified. The polymer had an $\eta sp/c$ of 0.27. The polymer was withdrawn from the reactor, and pulverized to a size of 18 to 24 mesh. The reaction product was transferred to a solid phase polymerization apparatus, and polymerized in the solid phase for 3 hours at an absolute pressure of 0.5 mmHg and a temperature of 250°C. The polymer obtained had an $\eta sp/c$ of 0.75.

The polymer was injection molded at 350°C., and the molded article was found to have a deflection temperature under load of 152°C.

COMPARATIVE EXAMPLE 1

This example illustrates the case of not using component (C).

Example 4 was repeated except that the amount of bisphenol A was changed to 228 parts, and ethylene glycol was not used. The resulting polymer had an $\eta sp/c$ of 0.22 before solid phase polymerization, and 0.44 after the solid phase polymerization. Further, the solid phase polymerization temperature was raised to 260°C., and the solid phase polymerization was carried out at this temperature for another 6 hours. The $\eta sp/c$ of this polymer was increased only to 0.49.

A comparison of Example 4 with Comparative Example 1 shows that the use of component (C) leads to a marked increase in the rate of polymerization in the solid phase.

COMPARATIVE EXAMPLE 2

Comparative Example 1 was repeated except that the amount of bisphenol A was changed to 239 parts.

The resulting polymer had an $\eta sp/c$ of 0.23 before solid phase polymerization, and 0.43 after the solid phase polymerization. The solid phase polymerization temperature was raised to 260°C., and the polymerization was carried out in the solid phase for an additional 6 hours. The $\eta sp/c$ of the polymer was increased only to 0.52.

It can be seen from the result that even if bisphenol A is used in a larger amount than in Comparative Example 1, the rate of increase in $\eta sp/c$ scarcely changes.

COMPARATIVE EXAMPLE 3

This example illustrates the case of using components (B) and (C) in a total amount of more than 130 mol % based on component (A).

Example 4 was repeated except that the amount of ethylene glycol was changed to 24.8 parts. During the initial melting reaction, the reaction product was not solidified but stable. The reaction product was withdrawn from the reactor, and pulverized to a size of about 18 to 24 mesh. The powder was immersed in acetone for 2 hours to crystallize it. The resulting crystallized polymer was polymerized in the solid phase under the same conditions as in Example 4. The polymer obtained had an $\eta sp/c$ of as low as 0.38, and during the solid phase polymerization, the polymer was partly melt-adhered.

COMPARATIVE EXAMPLE 4

This example illustrates the case of using component (C) in an amount exceedng 50 mol % based on component (A).

Example 4 was repeated except that the amounts of bisphenol A and ethylene glycol were changed to 171 parts and 34.1 parts, respectively. The reaction product ws crystallized and then polymerized in the solid phase in the same way as in Comparative Example 3. The polymer obtained had an $\eta sp/c$ of 0.37.

EXAMPLE 5

Example 1 was repeated except that 302 parts of diphenyl terephthalate and 16 parts of diphenyl isophthalate were used instead of 318 parts of diphenyl terephthalate in Example 1. The pre-reaction product obtained at an ester-interchange degree of 81.0 % was in the stable molten state at 280°C. under atmospheric pressure. The reaction product was withdrawn from the reactor while being rapidly cooled, and pulverized to a size of about 14 mesh. The polymer had an $\eta sp/c$ of 0.28. The polymer was heated at 180° to 200°C. for about 60 minutes to crystallize it. The temperature was raised from 230°C. to 260°C. over the course of about 2 hours in an atmosphere of nitrogen, and the crystallized pre-reaction product was polymerized in the solid phase at 260°C. for 4 hours. The resulting polymer had an ηsp/c of 0.68.

The polymer was injection molded under the same conditions as in Example 1. The molded article was found to have a deflection temperature under load of 160°C.

EXAMPLE 6

A reactor equipped with a rectifying column was charged with 318 parts of diphenyl terephthalate, 223 parts of bisphenol A, 33.8 parts of 4,4'-bis(β-hydroxyethoxy) diphenylsulfone and 0.07 part of titanium tetrabutoxide, and the reaction was performed for about 60 minutes at 250° to 280°C. Phenol resulting from the reaction was distilled out of the system. The reaction product was then transferred into a reactor equipped with a stirrer, and reacted at 280°C. under atmospheric pressure for 10 minutes. Then, the pressure of the reaction system was reduced gradually to below 0.5 mmHg over the course of 30 minutes. Stirring was stopped, and the reaction was continued for an additional 30 minutes. During this time, the reaction product was solidified. The reaction product was then withdrawn, and pulverized to a size of about 20 mesh. The polymer had an ηsp/c of 0.31. The pulverized polymer was polymerized in the solid phase for 3 hours at 260°C. and about 0.5 mmHg (absolute). The resulting polymer had an ηsp/c of 0.76. The polymer was then dried, and injection molded at 360°C. The molded article was found to have a deflection temperature under load of 165°C.

EXAMPLE 7

Example 6 was repeated except that 22.1 parts of 2,2-bis(4-β-hydroxyethoxyphenyl) propane was used instead of 33.8 parts of 4,4'-bis (β-hydroxyethoxy) diphenyl sulfone in Example 6. The resulting polymer had an ηsp/c of 0.30 before solid phase polymerization, and 0.69 after the solid phase polymerization. The deflection temperature under load of a molded article obtained in the same way as in Example 6 was 164°C.

EXAMPLE 8

A reactor equipped with a rectifying column was charged with 286.2 parts of diphenyl terephthalate, 31.8 parts of diphenyl isophthalate, 225.7 parts of bisphenol A, 20.3 parts of 4,4'-bis(β-hydroxyethoxy) diphenylsulfone and 0.07 parts of titanium potassium oxalate, and the reaction was performed for 60 minutes at 270° to 280°C, and then for 15 minutes at about 20 mmHg (absolute). Phenol resulting from the reaction was distilled out of the system. The reaction product was withdrawn from the reactor while being gradually cooled. During this time, the reaction product was crystallized (solidified). The polymer had an ηsp/c of 0.25. Then, the reaction product was pulverized to a size of about 20 mesh, and polymerized in the solid phase for 60 minutes at 230°C. and about 0.5 mmHg (absolute), and then for 3 hours at 260°C. The resulting polymer had an ηsp/c of 0.72. The polymer was injection molded at 350°C. The molded article was found to have a deflection temperature under load of 159°C.

EXAMPLE 9

A reactor equipped with a rectifying column was charged with 36.8 parts of diphenyl naphthalene-2,6-dicarboxylate, 21.7 parts of bisphenol A, 3.2 parts of 2,2-bis(4-β-hydroxyethoxyphenyl) propane and 0.007 part of titanium tetraisopropoxide, and the reaction was performed for 60 minutes at 280°C. under atmospheric pressure, and for 15 minutes at 280°C. and about 20 mmHg (absolute). Phenol resulting from the reaction was distilled out of the system. The reaction product was withdrawn from the reactor while being cooled rapidly. The polymer had an ηsp/c of 0.23. The polymer was pulverized to a size of about 20 mesh, and the resulting granular reaction product was immersed in acetone for 30 minutes to crystallize it. Then the crystallized reaction product was dried, and reacted in the solid phase for 5 hours at 260°C. in a stream of nitrogen gas. The resulting polymer had an ηsp/c of 0.71. The polymer was injection molded at 370°C. The deflection temperature under load of the molded article was 182°C.

EXAMPLE 10

A reactor equipped with a rectifying column was charged with 31.8 parts of diphenyl terephthalate, 22.3 parts of bisphenol A, 2.5 parts bis (β-hydroxyethyl) terephthalate and 0.008 part of titanium tetrabutoxide, and the reaction was performed at 250° to 280°C. for about 60 minutes. Phenol generated was distilled out of the system. The reaction product was transferred to a reactor equipped with a stirrer, and reacted for 10 minutes at 280°C. under atmospheric pressure. Then, the pressure of the reaction system was reduced gradually to 0.5 mmHg or below (absolute) after 30 minutes. Stirring was stopped, and the reaction was further continued for 30 minutes. During this time, the reaction product was solidified. The polymer had an ηsp/c of 0.28. The reaction product was withdrawn from the reactor, and pulverized to a size of about 20 mesh. The pulverized reaction product was polymerized in the solid phase for 3 hours at 260°C. and about 0.5 mmHg (absolute). The resulting polymer had an ηsp/c of 0.73.

The polymer was dried, and injection molded at 360°C. The molded product was found to have a deflection temperature under load of 159°C.

EXAMPLE 11

Example 10 was repeated except that 4.0 parts of a reaction product obtained by ester-interchange reaction of 19.4 parts of dimethyl terephthalate and 67.6 parts of 4,4'-bis(β-hydroxyethoxy) diphenylsulfone in the presence of 0.007 part of titanium tetrabutoxide was used instead of 1.3 parts of bis(β-hydroxyethyl) terephthalate in Example 10. The polymer had an ηsp/c of 0.30 before solid phase polymerization, and 0.78 after the solid phase polymerization. The deflection temperature under load of an injection molded article obtained in the same way as in Example 10 was 162°C.

EXAMPLE 12

A reactor equipped with 36.8 parts of diphenyl naphthalene-2,6-dicarboxylate, 22.6 parts of bisphenol A, 1.9 parts of polyethylene terephthalate (average degree of polymerization 4; an end carboxyl group concentration 3.0 equivalents/$10^6$ g) and 0.007 part of titanium tetraisopropoxide, and the reaction was performed for 60 minutes at 280°C. under atmospheric pressure, and then for 15 minutes at 280°C. and about 20 mmHg (absolute). Phenol resulting from the reaction was distilled out of the system. Then, the reaction product was withdrawn from the reactor while being cooled rapidly. The polymer had an ηsp/c of 0.23. The polymer was pulverized to a size of about 20 mesh, and immersed in acetone for 30 minutes. During this time, the reaction product was crystallized. The crystallized reaction product was dried, and polymerized in the solid phase for 5 hours in a stream of nitrogen at 260°C. The resulting polymer had an $\eta sp/c$ of 0.69. The polymer was injection molded at 370°C., and the molded article was found to have a deflection temperature under load of 179°C.

EXAMPLE 13

A reactor equipped with a rectifying column was charged with 9.3 parts of dimethyl isophthalate, 7.3 parts of neopentylene glycol and 0.07 part of titanium tetrabutoxide, and the reaction was performed at 150 to 230°C. Methanol resulting from the reaction was distilled out of the system. After almost a theoretical amount of methanol was distilled out, 286.2 parts of diphenyl terephthalate, 15.9 parts of diphenyl isophthalate and 225.7 parts of bisphenol A were added, and the reaction was performed for 60 minutes at 270° to 280°C. under atmospheric pressure, and then for 15 minutes at about 20 mmHg (absolute). Phenol resulting from the reaction was distilled out of the system. The reaction product was then withdrawn from the reactor while being gradually cooled. During this time, the reaction product was crystallized (solidified). This polymer had an $\eta sp/c$ of 0.27. The crystallized reaction product was pulverized to a size of about 20 mesh, and polymerized in the solid phase for 60 minutes at 230°C. and about 0.5 mmHg (absolute), and then for 3 hours at 260°C. The resulting polymer had an $\eta sp/c$ of 0.70. The deflection temperature under load of a molded article obtained by injection molded at 350°C. was 157°C.

EXAMPLE 14

A flask equipped with a rectifying column was charged with 83.0 parts of terephthalic acid, 111.7 parts of bisphenol A, 5.3 parts of neopentylene glycol, 235.4 parts of diphenyl carbonate and 0.034 part of titanium tetrabutoxide, and these compounds were heated to 230° to 280°C. Phenol resulting from the reaction was distilled out of the system, and after about 120 minutes, the reaction product became transparent. Then, the reaction product was transferred to a flask equipped with a stirrer, and the reaction was performed for 15 minutes at 280°C. The pressure of the reaction system was gradually reduced, and after 30 minutes, a reduced pressure of about 0.5 mmHg was attained. During this time, the reaction product was solidified. The polymer had an $\eta sp/c$ of 0.24. The reaction product was withdrawn from the reactor, and pulverized to a size of 16 to 20 mesh. The pulverized reaction product was polymerized in the solid phase for 3 hours at 260°C. and about 0.5 mmHg (absolute). The resulting polymer had an $\eta sp/c$ of 0.73.

The polymer was injection molded at a cylinder temperature of 370°C. and a mold temperature of 50°C. The molded article was found to have a deflection temperature under load of 161°C.

EXAMPLE 15

A flask equipped with a rectifying column was charged with 21.6 parts of naphthalene-2,6dicarboxylic acid, 22.8 parts of bisphenol A, 1.1 parts of neopentylene glycol, 53.5 parts of diphenyl carbonate and 0.007 part of titanium tetrabutoxide, and the reaction was performed for about 150 minutes at 240° to 260°C. Phenol resulting from the reaction was distilled out of the system. The product was transferred into a three-necked flask equipped with a stirrer, and stirred for 60 minutes at 280°C. under atmospheric pressure. Then, the pressure of the reaction system was gradually reduced, and after about 30 minutes, a reduced pressure of 0.5 mmHg (absolute) or less was attained. At this pressure, the reaction was carried out for an additional 30 minutes. At this stage, the reaction product was solidified. This product has an $\eta sp/c$ of 0.32.

The product so obtained was pulverized to a size of 16 to 20 mesh, and polymerized in the solid phase for 5 hours at 260°C. and 0.5 mmHg (absolute) with stirring.

The resulting polymer had an $\eta sp/c$ of 0.89 and was found to have a deflection temperature under load of 183°C.

EXAMPLE 16

A reactor equipped with a stirrer was charged with 318 parts of diphenyl terephthalate, 209 parts of bisphenol A, 53.4 parts of 1,1-bis(4-$\beta$-hydroxyethoxy diphenyl) cyclohexane and 0.08 part of titanium tetrabutoxide, and the reaction was performed for 60 minutes at 280°C. under atmospheric pressure, and then for another 60 minutes at a reduced pressure of about 10 mmHg. Phenol resulting from the reaction was distilled out of the reaction system. The reaction product was withdrawn while being rapidly cooled. The resulting reaction product had an $\eta sp/c$ of 0.28. The reaction product was pulverized to a size of about 20 mesh, and immersed in acetone for about 2 hours. It was dried, and polymerized in the solid phase for 2 hours at 280°C. and about 0.5 mmHg. The resulting polymer had an $\eta sp/c$ of 0.72. The polymer was injection molded at 360°C. The molded article was found to have a deflection temperature under load of 151° C.

EXAMPLE 17

Example 16 was repeated except that 104 parts of bisphenol A and 105 parts of bisphenol Z were used instead of 209 parts of bisphenol A in Example 16. The resulting polymer had an $\eta sp/c$ of 0.25 before solid phase polymerization and 0.69 after the solid phase polymerization. The deflection temperature under load of an injection molded article obtained in the same way as in Example 16 was 155°C.

We claim:

1. In a process of preparing linear aromatic polyesters by reacting in a molten state (A) a member selected from the group consisting of aromatic dicarboxylic acids and lower alkyl esters and aryl esters thereof with (B) a diphenol to prepare a polymer and thereafter polymerizing the thus obtained polymer in the solid phase, the improvement which comprises carrying out said reaction in the presence of (C) at least one member selected from the group consisting of the dihydroxy compounds, bisglycol esters of dicarboxylic acids and glycol esters of hydroxycarboxylic acids, said dihydroxy compound selected from the group consisting of a straight chain or branched chain aliphatic glycol of 2 – 12 carbon atoms, an alicyclic glycol and a compound having attached to its aromatic nucleus two members of the class consisting of hydroxyalkylene and hydroxyalkyleneoxy groups, the alkylene portion of which contains 2 – 6 carbon atoms, the components (B) and (C) being used in proportions, based on (A), of 70 –

105 mol % of (B) and 1 – 50 mol % of (C), the total amount of (B) and (C) corresponding to 100 – 130 mol % of (A).

2. The process of claim 1 wherein said component (C) aliphatic glycol is neopentyl glycol.

3. The process of claim 1 wherein said component (C) compound having two hydroxyalkyleneoxy groups is a member selected from the group consisting of 4,4'-bis($\beta$-hydroxyethoxy)diphenylsulfone, 2,2-bis(4-$\beta$-hydroxyethoxyphenyl)propane and 1,1-bis(4-$\beta$-hydroxyethoxyphenyl)cyclohexane.

4. The process of claim 1 wherein said component (C) carboxylic acid ester is a member of the group consisting of bis ($\beta$-hydroxyethyl) terephthalate and polyethylene terephthalate that is terminated with a glycol component and has a polymerization degree of not greater than 10.

5. The process of claim 1 wherein said component (A) is a diaryl ester of an aromtic dicarboxylic acid.

6. The process of claim 1 wherein said components (C) and (B) are used in proportions such that the total thereof amounts to 105 – 120 mol % of component (A).

7. The process of claim 1 which comprises carrying out the reaction in the presence of a diaryl carbonate in a proportion of at least 150 mol % of component (A) in the case where said component (A) is a free aromatic dicarboxylic acid.

8. The process of claim 1 wherein the reaction in the molten state is carried out until the reduced specific viscosity as measured in a 60 : 40 weight ratio phenol-tetrachloroethane solvent mixture at 35°C. comes within the range of 0.15 – 0.4.

9. The process of claim 1 wherein said solid phase polymerization reaction is carried out until the reduced specific viscosity of the final product becomes at least 0.5

10. The process of claim 1 which comprises submitting the molten polymerization reaction product to the solid phase polymerization reaction after heat treating said reaction product or treating said reaction product with a crystallizing solvent.

* * * * *

UNITED STATES PATENT AND TRADEMARK OFFICE
CERTIFICATE OF CORRECTION

PATENT NO. : 3,972,852
DATED : August 3, 1976
INVENTOR(S) : Hiroo Inata et al

It is certified that error appears in the above-identified patent and that said Letters Patent are hereby corrected as shown below:

Item 30, line 6, delete "May 27, 1974", insert -- May 24, 1974 --

Signed and Sealed this

Twelfth Day of October 1976

[SEAL]

Attest:

RUTH C. MASON
*Attesting Officer*

C. MARSHALL DANN
*Commissioner of Patents and Trademarks*